US006522898B1

(12) United States Patent
Kohno et al.

(10) Patent No.: US 6,522,898 B1
(45) Date of Patent: Feb. 18, 2003

(54) RADIO COMMUNICATION SYSTEM

(75) Inventors: Ryuji Kohno, 1202-9, Hazawa-cho, Kanagawa-ku, Yokohama-shi, Kanagawa (JP); Hiroki Mochizuki, Numazu (JP)

(73) Assignees: Toshiba Tec Kabushiki Kaisha, Tokyo (JP); Ryuji Kohno, Yokohama (JP)

( * ) Notice: Subject to any disclaimer, the term of this patent is extended or adjusted under 35 U.S.C. 154(b) by 0 days.

(21) Appl. No.: 09/576,289

(22) Filed: May 23, 2000

(30) Foreign Application Priority Data

May 24, 1999 (JP) ............................................ 11-143466

(51) Int. Cl.[7] .............................. H04B 1/38; H04M 1/00
(52) U.S. Cl. .......................... 455/562; 455/69; 342/383
(58) Field of Search .................................. 455/562, 424, 455/67.4, 422, 33.3, 54.1, 33.1, 69, 272, 273, 275, 276.1; 342/380, 383, 378

(56) References Cited

U.S. PATENT DOCUMENTS

| 5,615,409 | A |  | 3/1997 | Forssen et al. |
| 5,790,606 | A | * | 8/1998 | Dent ........................... 375/233 |
| 5,936,577 | A | * | 8/1999 | Shoki et al. ................. 342/373 |
| 6,087,986 | A | * | 7/2000 | Shoki et al. ................. 342/383 |
| 6,385,457 | B1 | * | 5/2002 | Dam et al. ................... 455/436 |
| 6,404,803 | B1 | * | 6/2002 | Wang et al. ................. 375/144 |
| 2002/0042290 | A1 | * | 4/2002 | Williams et al. ............. 455/562 |

FOREIGN PATENT DOCUMENTS

| JP | 9-219615 | 8/1997 |
| JP | 9-232848 | 9/1997 |

* cited by examiner

Primary Examiner—Nguyen T. Vo
Assistant Examiner—Kamran Afshar
(74) Attorney, Agent, or Firm—Frishauf, Holtz, Goodman & Chick, P.C.

(57) ABSTRACT

A radio communication system is disclosed in which radio communications are performed between a base station and a number of terminal stations. In the base station, a weight value storage section stores amplitude and phase weight values used when a terminal station to communicate with the base station is specified and scanning weight values that allow the base station to scan its associated service area with directional beams when no terminal station is specified. A directivity controller controls the directivity of an array antenna using the scanning weight values stored in the storage section so that the base station scans its associated service area when no terminal is specified. When a communication request signal and a terminal identification signal are received from a terminal, it is specified as a requesting terminal. The directivity controller then determines the directivity of the array antenna on the basis of the weight values corresponding to that requesting terminal station, so that data transmissions are performed between the base station and the requesting terminal station.

12 Claims, 14 Drawing Sheets

RADIO COMMUNICATION SYSTEM

CROSS-REFERENCE TO RELATED APPLICATIONS

This application is based upon and claims the benefit of priority from the prior Japanese Patent Application No. 11-143466, filed May 24, 1999, the entire contents of which are incorporated herein by reference.

BACKGROUND OF THE INVENTION

The present invention relates to a radio communication system that is applied to, for example, indoor wireless radio LAN systems and adapted for data transmissions between a base station and a number of terminal stations.

Radio communications in indoor space are highly susceptible to fading due to multipath (multiple reflected waves). It is therefore effective to transmit and receive with directivity concentrated in the direction of maximum reception. For example, Japanese Unexamined Patent Publication No. 9-232848 discloses radio communications equipment that is constructed, as shown in FIG. 15, from an antenna array 1, circulators 2, receive modules 3 each comprising a low-noise amplifier and a down converter (D/C), analog-to-digital (A/D) converters 4, quasi-coherent detectors 5, local oscillators 6 and 7, a digital beam former (DBF) 8, a beam selector 9, a maximum ratio combiner 10, a demodulator 11, an in-phase divider 12, phase/amplitude correction units 13, a weight separation calculation circuit 14, a transmission weight calculation circuit 15, quadrature modulators 16, transmitting modules 17 each consisting of an up converter and a transmitting power amplifier, and transmitting local oscillators 18 and 19.

Signals received by the elements of the antenna array 1 are amplified and converted into intermediate-frequency signals in the receive modules 3 and then converted into digital signals in the AID converters 4. The digital signals are subjected to quasi-coherent detection in the quasi-coherent detectors 5 and then combined in the maximum ratio combination circuit 10 while varying their weight values so that S/N (signal to noise ratio) becomes maximum. At transmit time, the transmission weight calculation circuit 15 calculates transmitting weight values on the basis of the receiving weight values calculated by the weight separation/calculation circuit 14. After transmit signals are weighted by the transmitting weight values, a transmitting main beam is formed and transmitted in the direction of maximum reception from the antenna array 1 via the quadrature modulators 16 and the transmitting modules 17.

The conventional equipment needs to calculate the direction of arriving radiation in real time (namely, sequentially) and switch the directivity of the antenna in order to track the station with which the connection has been set up. As a result, the calculation processing is performed mainly by hardware rather than by software. Thus, the equipment has a problem of being complex in circuit arrangement and increasing in size.

To solve that problem, Japanese Unexamined Patent Publication No. 9-219615 discloses an adaptive array transmitter-receiver, which is provided, as shown in FIG. 16, with an array antenna 21 comprised of a plurality of antenna elements, weighting units 22 for weighting the amplitude and phase of each of signals which are to be transmitted from or are received by the antenna elements, a divider/combiner 23 for dividing transmit signals to the antenna elements or combining received signals from the antenna elements through the weighting units 22, an interface (I/F) 25, and an external operations unit 26. The external operations unit 26 performs calculations for adaptive control of the antenna directivity in non-real time for each terminal to which transmission is to be performed and makes weight switching from terminal to terminal on a time-division basis with a time slot preallocated for each terminal. This allows the transmitter-receiver to be made simple in construction and reduced in size.

Each weighting unit 22 varies the phase and the amplitude in a signal supplied from the dividing/synthesis units 23 by predetermined amounts, or multiply the signal by a complex weight. Thus, the radio waves radiated from the antenna elements form a desired synthetic transmission directional pattern.

On the other hand, the phase and the amplitude of each of the signals received by the plural antenna elements are controlled by the weighting units 22 or the signal is multiplied by the complex weight. Then, the signals are combined by the dividing/synthesis unit 23. The desired receiving directional pattern can be formed in this manner.

In the adaptive array transmitter-receiver disclosed in Japanese Unexamined Patent Publication No. 9-219615, in performing communications between the base station installed with the adaptive array antenna and each terminal, transmitting and receiving time slots are preallocated for each terminal. That is, with a system comprising a base station and N terminals, N transmitting time slots and N receiving time slots are preallocated. Each terminal is allowed to communicate with the base station only in time slots allocated to it.

With such a configuration, time slots allocated for each terminal are occupied by it regardless of whether it makes a request for communications. In the absence of a communication request, therefore, the allocated time slots result in waste of time. In addition, for terminals having a request for communications of large amounts of data, fixed time slots are not enough for such communication because of limited communication time. Data have therefore to be transmitted in a number of time slots, which results in reduced data communication efficiency.

In recent years, a wireless POS (point of sales) system has been installed in large-scale stores. In this wireless POS system, which consists of a host computer connected to the base station and a number of POS terminals connected with terminal station, inquiries about prices of goods and sales registration data are transmitted between the host computer and each POS terminal by radio. If, when the aforementioned adaptive array transmitter-receiver is used with the wireless POS system, communication requests for inquiries about prices of goods and sales registration data are intensively made by a certain POS terminal to the host computer, the length of the time slots allocated for that terminal may sometimes become insufficient. On the other hand, when another POS terminal makes no communication request, the time slots allocated for it result in waste of time. Therefore, the wireless POS system used with the conventional Adaptive array antenna is poor in efficiency.

BRIEF SUMMARY OF THE INVENTION

It is an object of the present invention to provide a radio communications device for use in a base station which permits communications to be efficiently performed with a terminal station that makes a request for communications, does not spend any time on terminal stations that make no request for communications, and is simple in construction and a radio communication system which includes such a base station and a number of terminal stations.

In order to achieve the above object, according to the present invention, there is provided a radio communication system comprising a base station having a radio communications device that includes a receiving section which weights the amplitude and phase of each of received signals from a plurality of antenna elements, then combines the weighted signals into a composite signal and demodulates the resultant composite signal and a transmitting section which divides a modulated signal into a plurality of transmit signals, then weights the amplitude and phase of each of the transmit signals and radiates each of the weighted transmit signals from a corresponding respective one of the antenna elements, and a plurality of terminal stations each of which performs communications with the base station by radio, each of the terminal stations including transmitting means for, when a communication request occurs in it, transmitting a communication request signal in response to reception of a base station identification signal from the base station; and the base station further comprising: weight value storage means for storing a set of amplitude and phase weight values for each of the terminal stations, each set of amplitude and phase weight values being used when a corresponding one of the terminal stations communicates with the base station and the amplitude and phase weight values in each set being determined for each of the antenna elements, and storing scanning amplitude and phase weight values used when the base station scans its associated service area with directional beams to search for a terminal station that makes a request for communications; base station identification signal transmitting means for transmitting a base station identification signal via the transmitting section; communication request receiving means for receiving the communication request signal transmitted from a terminal station in response to the base station identification signal; terminal station identifying means for identifying the requesting terminal station that has transmitted the communication request signal received by the communication request receiving means; directivity control means for, when no terminal station to communicate with the base station is specified, controlling the directivity of the transmitting and receiving sections on the basis of the scanning amplitude and phase weight values to cause the base station to scan its associated service area with directional beams and, when a terminal station is specified, fixing the directivity of the transmitting and receiving sections on the basis of the weight values corresponding to that terminal station specified; and means for radio communicating with the terminal station specified with the directivity of the transmitting and receiving sections controlled by the directivity control means.

In the present invention, without allocating time slots for each terminal station, a terminal station that makes a request for communications is identified exactly and the directivity of the antenna for that terminal station is determined by preset weight values for communications between the base station and the identified terminal station. Thus, the present invention allows efficient communications with a terminal station that makes a request for communications and does not spend any time on terminal stations that make no request for communications. In addition, the weight values are not calculated for each terminal station in real time but are stored previously in a memory, thus providing a radio communication system simple in construction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiments of the present invention will be described hereinafter with reference to the accompanying drawings.

First Embodiment

Figure 1:
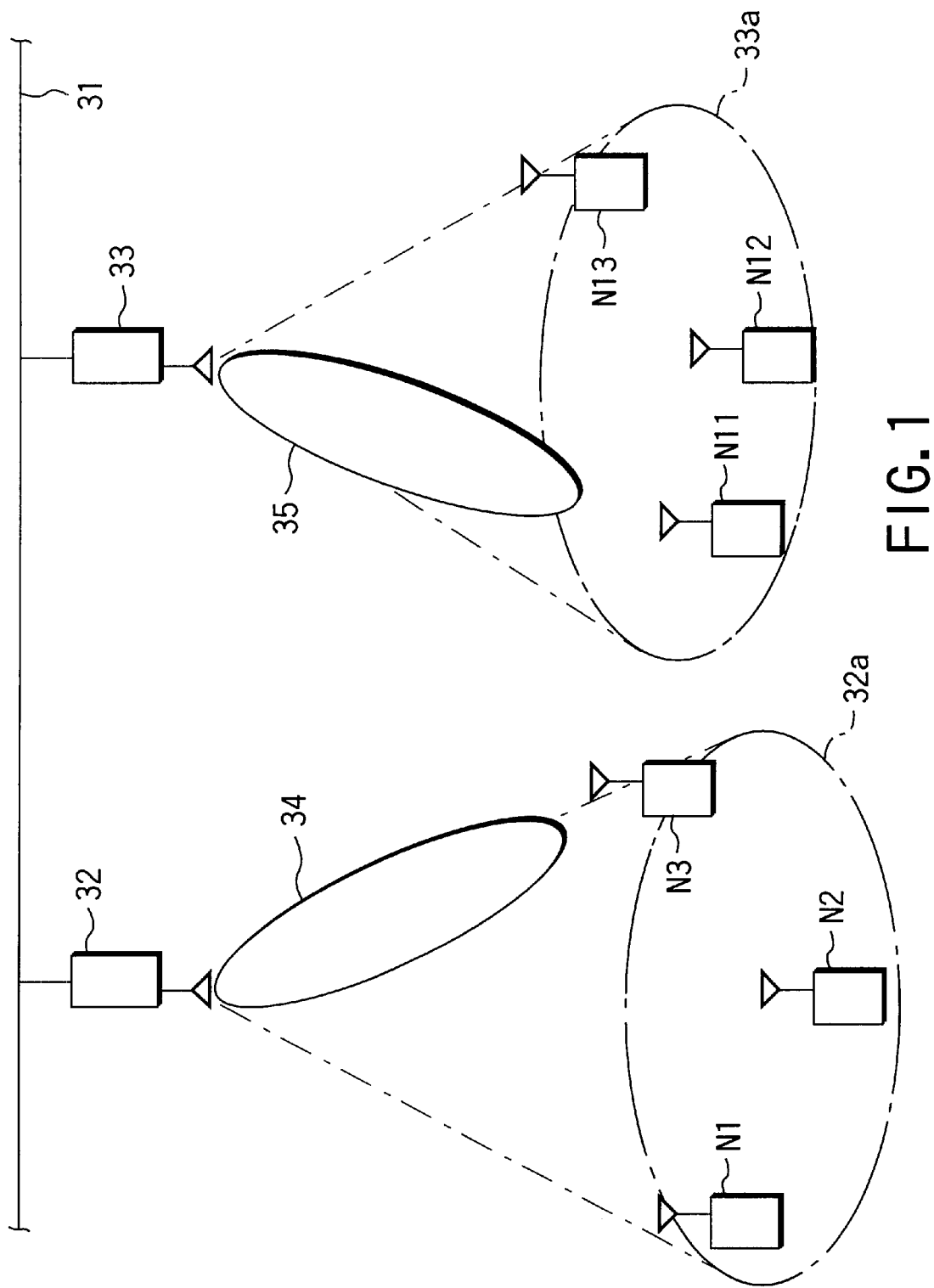
FIG. 1 is a schematic illustration of an indoor radio communication system to which the present invention is applied.

FIG. 1 is a schematic illustration of an indoor radio communication system to which the present invention is applied. In this system, as an example, base stations 32 and 33 are connected to a local area network (LAN) 31. Terminal stations N1, N2 and N3 are installed in the service area 32a of the base station 32. Terminal stations N11, N12 and N13 are placed in the service area 33a of the base station 33.

In order not to suffer multipath fading, each of the base stations 32 and 33 uses a directional beam 34 or 35 for communications with an individual one of its associated terminal stations N1 to N3 or N11 to N13. The base stations 32 and 33 are generally mounted on the ceiling of a store.

Each of the terminal stations N1 to N3 and N11 to N13 is used attached to a POS terminal in a wireless POS system. In the wireless POS system, data are transmitted by radio between the host equipment that manages the overall sales of the shop and each of the POS terminals that register data on sales of goods at individual counters. The POS terminals are not used while being moved, but once they are located, they are not moved for a relatively long period of time. Thus, the directional beams 34 and 35 each differ in optimum direction and beam pattern for each of their associated terminal stations located in different places.

Unlike the base stations, each of the terminal stations is allowed to use either of directional and nondirectional beams for communication with a corresponding one of the base stations 32 and 33. For example, when a communication request occurs in the terminal station N1, it sends a communication request signal to the corresponding base station 32 upon receipt of a base station identification signal therefrom.

Figure 2:
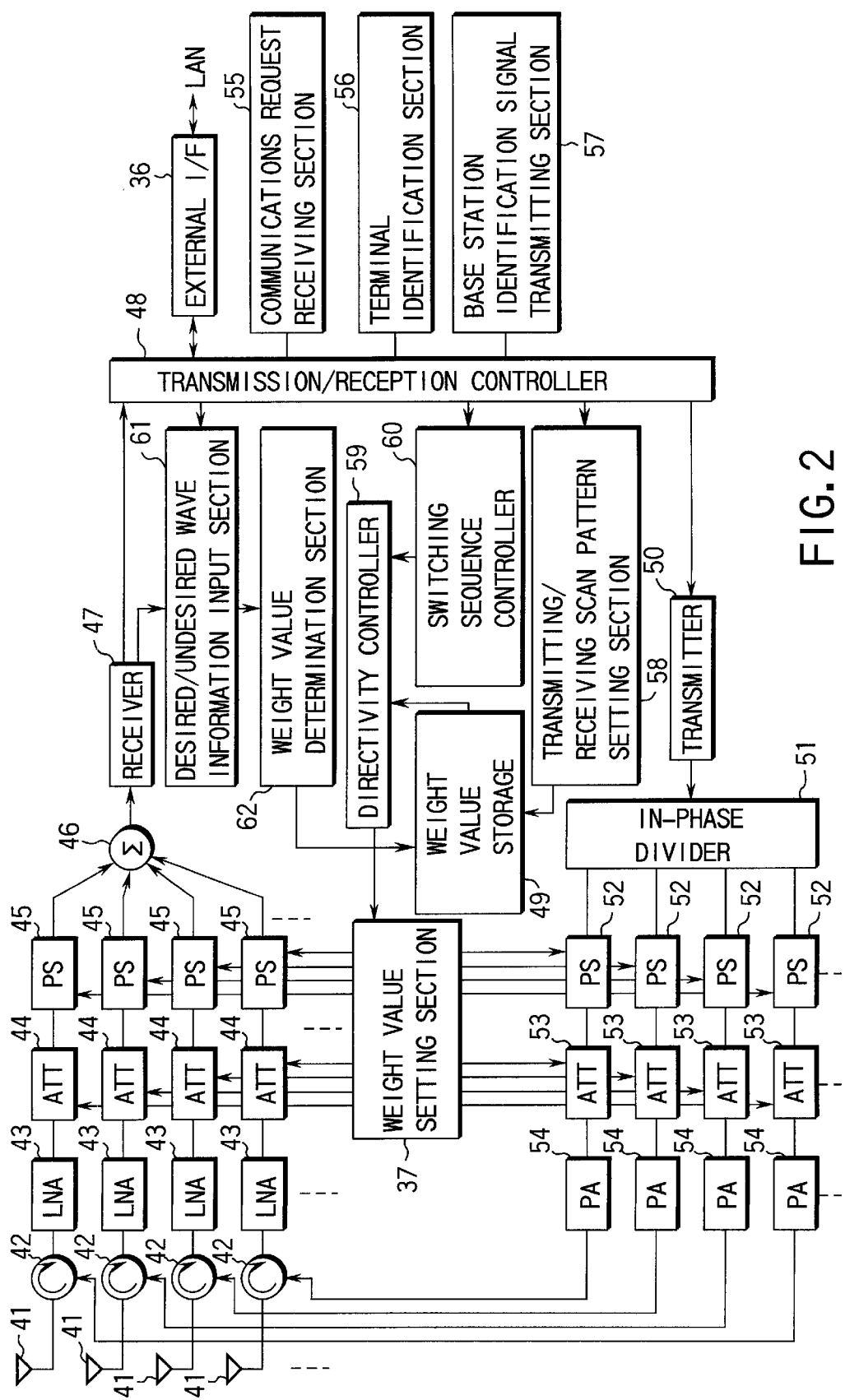
FIG. 2 is a block diagram of a base station according to a first embodiment of the present invention.

Referring now to FIG. 2, there is illustrated, in block form, the arrangement of each of the base stations. The base station is provided with an antenna array consisting of a plurality of antenna elements 41 adapted for both transmission and reception, circulators 42 each corresponding to one of the antenna elements, low-noise amplifiers (LNA) 43 each for amplifying a received signal from a corresponding one of the circulators, attenuators (ATT) 44 each for controlling the amplitude of an amplified signal from a corresponding one of the low-noise amplifiers, and phase shifters (PS) each for controlling the phase of an output signal of a corresponding one of the attenuators.

The received signals from the phase shifters 45 are combined in a linear combiner 46 and then applied to a receiver 47. This receiver performs receiving operations, such as demodulation, etc., and outputs recovered data, which is, in turn, applied to a transmission/reception controller 48. The controller then sends the recovered data to the host equipment via an external interface (I/F) 36 and the LAN 31.

The antenna elements 41, the circulators 42, the low-noise amplifiers 43, the attenuators 44, the phase shifters 45, the linear combiner 46 and the receiver 47 form a receiving section. Each of the attenuators 44 independently controls the amplitude of received signal and each of the phase shifters 45 independently controls the phase of received signal. The amounts by which the amplitude and phase are controlled are set by weight values stored in a weight value storage section 49. A directivity controller 59 reads the weight values from the weight value storage section 49 and delivers them to a weight value setting section 37, which in turn outputs the weight values to the attenuators 44 and the phase shifters 45 to keep their output values. Desired receiving directivity is formed by appropriately weighting the received signals from the antenna elements 41 by the weight values from the weight value storage section 49.

A transmitter 50 modulates transmit data from the transmission/reception controller 48 to provide a transmit signal. An in-phase divider 51 divides the transmit signal from the transmitter 50 into in-phase signals corresponding in number to the antenna elements. Phase shifters (PS) 52 each shift the phases of the respective in-phase signals from the divider 51 and attenuators (ATT) 53 each control the amplitudes of the respective phase-shifted signals from the phase shifters. Power amplifiers (PA) 54 each subject the output signals of the respective attenuators to power amplification. The output signals of the respective power amplifiers are transmitted from the antenna elements 41 via the circulators 42. The circulators have a function of switching between transmission and reception.

The transmitter 50, the in-phase divider 51, the phase shifters 52, the attenuators 53, the power amplifiers 54, the circulators 42 and the antenna elements 41 constitute a transmitting section. The attenuators 53 and the phase shifters 52 independently control the amplitude and phase of transmit signals. The controlled amounts are set, as described previously, on the basis of weight values stored in the weight value storage section 49. Thus, by appropriately weighting the amplitudes and phases of respective transmit signals by weight values from the weight value storage section 49, a desired directional beam for transmission is formed by the adaptive array antenna.

To the transmission/reception controller 48 are connected a communication request receiving section 55, a terminal station identification section 56, and a base station identification signal transmitting section 57. The base station identification signal transmitting section 57 transmits a base station identification signal via the transmitting section. The communication request receiving section 55 receives through the receiving section a communication request signal transmitted from a terminal station in response to the base station identification signal. The terminal station identification section 56 identifies (specifies) the terminal station that transmitted the communication request signal received by the communication request receiving section 55.

The transmission/reception controller 48 controls a transmission/reception scan pattern setting section 58 so that it sets in the weight value setting section 37 scanning weight values adapted to cause the base station to scan its associated service area with directional beams at the time when no terminal station is specified.

A directivity controller 59 controls the directivity of the transmitting and receiving sections on the basis of the scanning weight values stored in the weight value storage section 49 when no terminal station is identified, allowing the base station to scan its service area. After a terminal station has been identified by the terminal station identification section 56, the directivity controller reads the weight values associated with that specified terminal station from the weight value storage section 49 and sets the directivity of the transmitting and receiving sections.

Upon termination of communications with the terminal station identified by the terminal station identification section 56, a switching sequence controller 60 judges that no terminal station is identified and instructs the directivity controller 59 to scan the associated service area with directional beams. The sequence controller repeats this process whenever communications with a terminal station terminates.

With this system, once the terminals N1, N2, N3, N11, N12 and N13 have been installed, they will not be moved over a relatively long period of time. It becomes therefore possible to know beforehand the location of each individual terminal station and the location of a source of unwanted radiation, that is, the direction of desired radiation from each terminal station and the direction of undesired radiation. Also, it becomes possible to know beforehand the received levels of desired and undesired waves and thermal noise that occurs in each antenna element through actual measurements and calculations.

Thus, if the directions of desired radiation and undesired radiation, received power levels and thermal noise of each antenna element are known, then the optimum weight values for transmission and reception can be determined for each terminal station through calculations on the basis of the adaptive processing theory for adaptive array antenna and the directivity synthesis theory for array antenna. The arrangement of the antenna elements and the used frequency of the array antenna are known.

A desired/undesired wave information input section 61, upon receipt from the receiver 47 of information concerning the direction of desired radiation from each terminal station, the direction of undesired radiation, their received power levels, and noise power of each antenna element in the control of the transmission/reception controller 48, supplies the information to a weight value determination section 62. In response to the information, the weight value determination section calculates the optimum weight values for transmission to and reception from each terminal station and places the calculated weight values into the weight value storage section 49.

Figures 3, 4A, 4B:
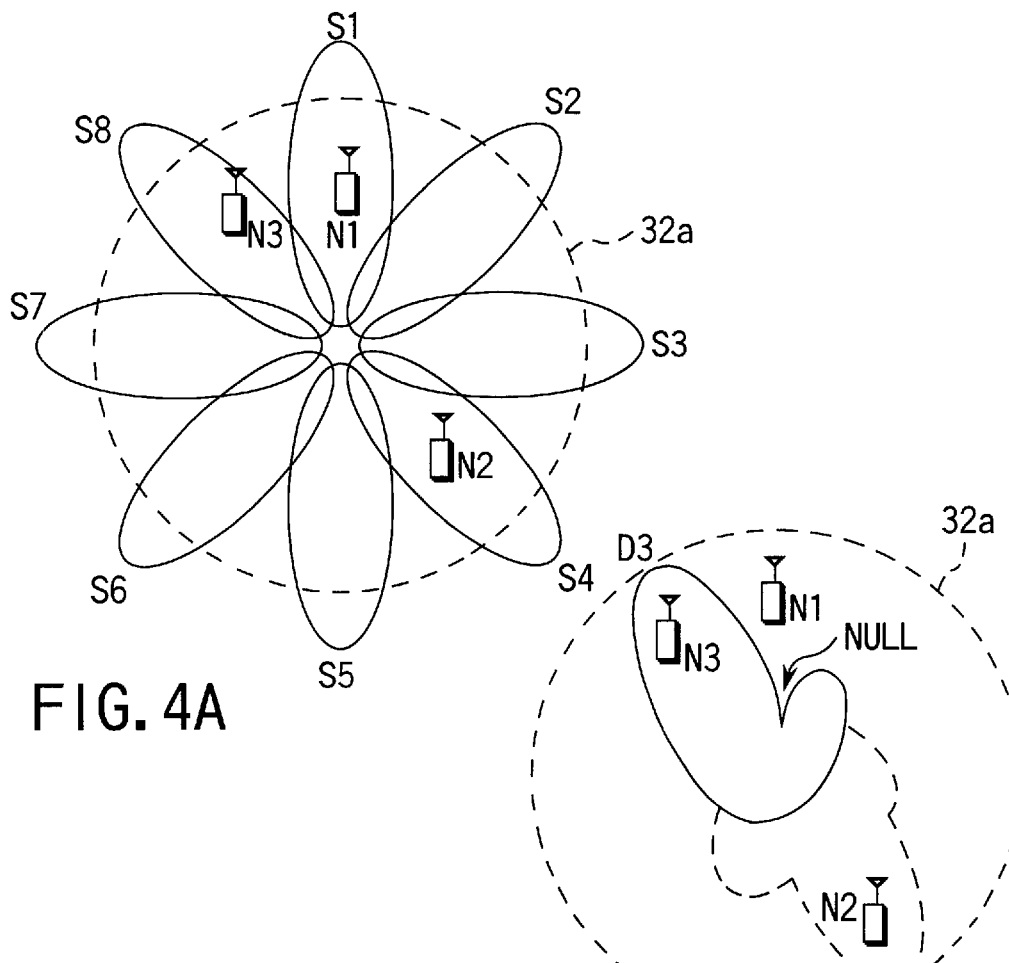
FIG. 3 shows weight values stored in the form of a table in the weight value storage section in FIG. 2.
FIG. 4A shows directional patterns of the base station when no terminal station is specified in the first embodiment.
FIG. 4B shows a directional pattern of the base station when a terminal station has been specified in the first embodiment.

FIG. 3 shows settings of weight values for the terminal stations N1, N2, N3, . . . stored in the weight value storage section 49. In this storage section are stored amplitude and phase weight values for each terminal station. That is, the amplitude weight values that are each set in the respective individual attenuators 44 corresponding to the antenna elements 41 for the terminal station N1 are A11, A12, A13, A14, . . . The phase weight values that are each set in the respective individual phase shifters 45 are P11, P12, P13, P14, . . .

For example, if the amplitude weight values in the attenuators 44 are set to A11, A12, A13, A14 and the phase weight values in the phase shifters 45 are set to P11, P12, P13, P14, then an electromagnetic wave radiated from the adaptive array antenna forms a directional pattern which is directed to the arriving desired wave, i.e., to the terminal station N1, and has a characteristic of removing the undesired waves. By sequentially changing the weight values set in the attenuators 44 and the phase shifters 45, the base station can emit directional beams in all directions. Thus, the base station can scan the service area by directional beams.

The transmission/reception controller 48, the communication request receiving section 55, the terminal station identification section 56, the base station identification signal transmitting section 57, the transmission/reception scan pattern setting section 58, the directivity controller 59, the sequence controller 60, and the desired/undesired wave information input section 61 and the weight value determination section 62 are implemented by a microcomputer.

FIG. 4A shows directional patterns of the base station when no terminal station is specified and FIG. 4B shows a directional pattern of the base station after a terminal station has been specified to be a requesting terminal by the terminal station identification section 56. In this system, when no terminal station is specified, the scanning weight values are read sequentially from the weight value storage section 49 into the attenuators 44 and the phase shifters 45 so that the base station 32 for example, sequentially scans its service area 32a as indicated by the directional beam patterns S1, S2, S3, . . . , S8 in FIG. 4A.

For example, upon receiving a terminal identification signal and a communication request signal from the terminal station N3 when the directional beam S8 is emitted, the base station starts communication with the terminal station N3. The directional pattern at that time is the optimum pattern for the terminal station N3 as indicated at D3 in FIG. 4B. The directional pattern D3 is in the null state for the direction of undesired radiation, i.e., it has little sensitivity in the direction of the undesired wave. The directional pattern D2 indicated by dash-dotted line in FIG. 4B indicates the optimum pattern for communication with the terminal station N2.

Figure 5:
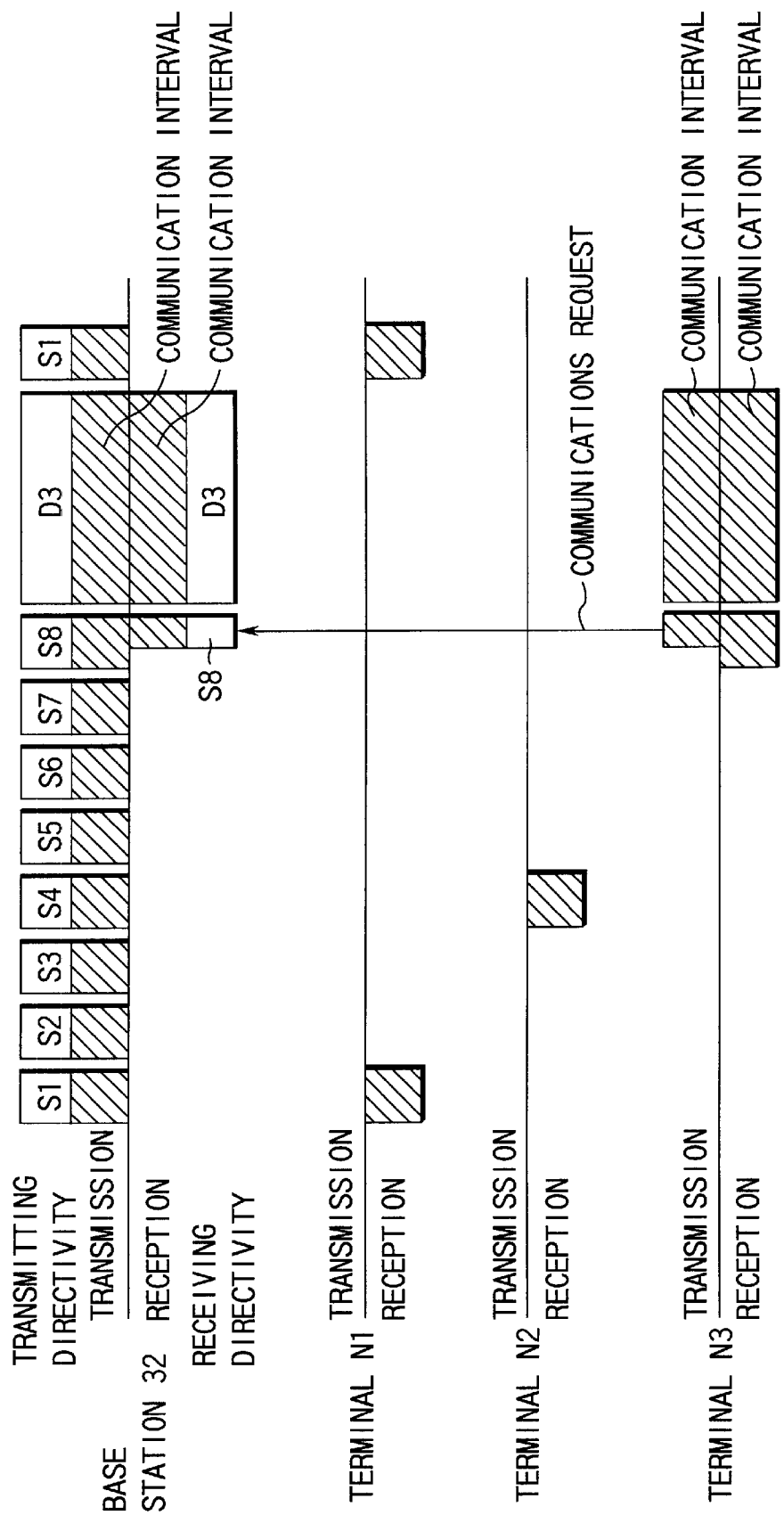
FIG. 5 is a timing diagram illustrating the operation of communications between the base station and a terminal station in the first embodiment.

FIG. 5 is a timing diagram illustrating the operation of communications between base station and terminal stations associated with the base station. The base station 32 emits directional beams S1, S2, S3, . . . , S8, each containing a base station identification signal produced by the base station identification signal transmitting section 57, in sequence to scan the service area 32a. As shown in FIG. 5, the terminal station N1 receives the base station identification signal from the base station 32 via the directional beam S1 but makes no response because of no occurrence of a communication request. Likewise, the terminal station N2 receives the base station identification signal from the base station 32 via the directional beam S4 but makes no response because of no occurrence of a communication request.

Upon receiving the base station identification signal via the directional beam S8, the terminal station N3, which is making a request for communication, sends a communication request signal as well as its identification signal to the base station 32. Upon receipt of the identification signal and the communication request signal from the terminal station N3, the base station 32 causes the communication request receiving section 55 to confirm that the terminal station N3 is making a communication request and the terminal station identification section 56 to identify the terminal station N3 as a requesting terminal station with which the connection is to be set up.

Then, the directivity controller 59 reads the weight values associated with the terminal station N3 from the weight value storage section 49 into the weight value setting section 37, which in turn sets the amplitude weight values in the attenuators 44 and 53 and the phase weight values in the phase shifters 45 and 52.

The base station 32 then sets the directional pattern of the transmitting and receiving sections to D3 shown in FIG. 4B and starts communications with the terminal station N3. Thereby, data are transmitted between the base station 32 and the terminal station N3. Upon termination of the communications, the sequence controller 60 determines that the communications have been terminated and then instructs the directivity controller 59 to scan the associated service area with directional beams. The directivity controller 59 then reads the scanning weight values from the weight value storage 49 into the weight value setting section 37. In this case, the directivity controller supplies the weight value setting section with the weight values in the order of a set of weight values associated with the directional beam S1, a set of weight values associated with the directional beam S2, and so on. The weight value setting section 37 sets each set of weight values in the attenuators 44 and 53 and the phase shifters 45 and 52 in sequence.

Then, the base station 32 scans its associated service area 32a with the directional beams S1, S2, S3, . . . , S8 each containing the base station identification signal. In this manner, the directivity controller 59 starts scanning of the associated service area with the directional beams S1 to S8 at each termination of communications between the base station and a specified terminal station.

It is desirable that the time period during which the directional beams S1 to S8 are emitted in sequence, i.e., the scanning period, is much shorter than the period of the conventional time-division system in which each of terminal stations is allocated a time slot. In the present embodiment, therefore, a terminal station that is needing communications is allowed to have a required communication time. In addition, terminal stations that make no request for communications are merely scanned with directional beams with no waste of time. In other words, the base station can communicate with multiple terminal stations in an efficient manner. In the service area 33a as well, the base station 33 controls the terminal stations N11, N12 and N13 in the same manner as the base station 32 controls the terminal stations N1, N2 and N3.

In the present system, the weight value determination section 62 in the base stations 32 and 33 previously calculates optimum transmission/reception weight values for each terminal station and then stores them in the weight value storage section 49. At communication time, the directivity controller 59 reads a set of weight values corresponding to each terminal station from the storage section and sets them in the attenuators and phase shifters, allowing highly reliable communication with each terminal station using an optimum directional beam.

When the location of each terminal station and the location of a source of undesired radiation are fixed as in the present system, the directions at which the desired radiation and the undesired radiation arrive can be known in advance. The undesired radiation include noise emitted from microwave ovens and so on.

The thermal noise of each element in the transmitting and receiving sections and the power of desired and undesired radiation and so on can be measured or estimated in advance. In order to estimate the directions of arriving desired and undesired waves on the basis of received signals, use may be made of a beam former method that searches for the direction of arriving radiation by actually emitting scan beams or a MUSIC algorithm based on eigenvalue expansion of received signal correlation matrix, or the like. The arrangement and spacing of the antenna elements 41 and the frequency used are known in advance.

The knowledge of such information allows the receiving section to determine optimum weighting values for the antenna elements on the basis of the adaptive processing theory of array antennas and the transmitting section to determine optimum weighting values for the antenna elements on the basis of the directivity synthesis theory of array antennas.

Figure 6:
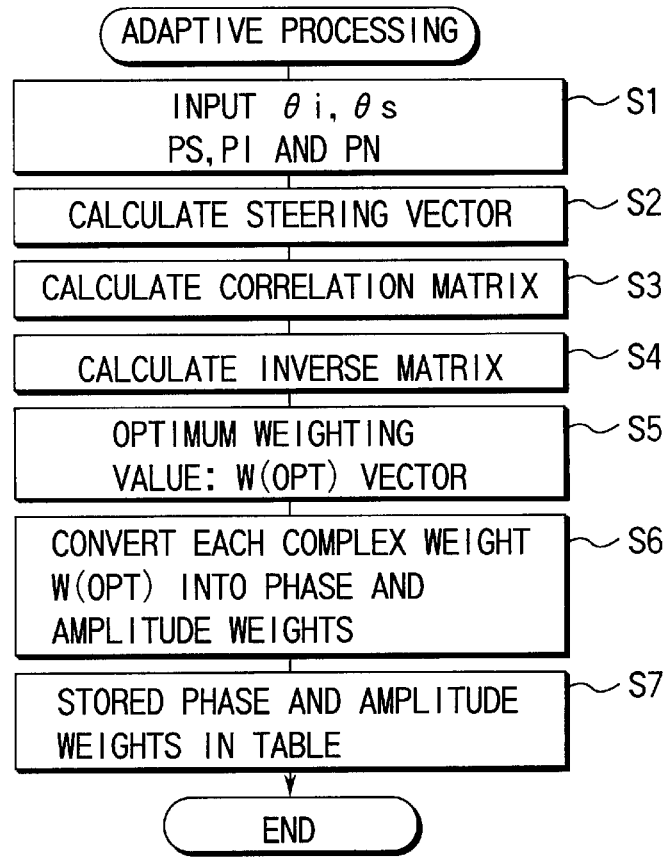
FIG. 6 is a flowchart for adaptive processing for determining weight values set in the receiving section in the first embodiment.

FIG. 6 shows an example of an algorithm for determining optimum weighting values for reception on the basis of the array antenna adaptive processing theory, which is referred to as the MSN (maximum signal to noise ratio) algorithm. The weight value determination section 62 calculates receiving weight values through the use of adaptive processing based on the MSN algorithm.

In this adaptive processing, first, the weight value determination section 62 is input in step S1 with the direction at which undesired radiation arrive ($\theta_i$), the direction at which desired radiation arrive ($\theta_s$), the input power of the desired radiation (Ps), the input power of the undesired radiation (Pi), and the amount of thermal noise power of each element in the receiving section (Pn) and then produces an input signal vector X(t) in accordance with the following equation $$X(t)=S(t)+I(t)+N(t) \qquad (1)$$

where vector S(t) represents desired radiation, vector I(t) represents undesired radiation and vector N(t) represents noise power.

Then, in step 52, a steering vector, $\bar{s}$, is calculated by $$\bar{s} = \left[ \exp\left(j\frac{2\pi}{\lambda} \cdot dl \cdot \sin\theta_s\right), \dots, \exp\left(j\frac{2\pi}{\lambda} \cdot dk \cdot \sin\theta_s\right) \right]^T \qquad (2)$$

Note here that the spacing of the antenna elements, d, and the wavelength, $\lambda$, are known.

Subsequently, in step S3, the correlation matrix Rxx is calculated by $$Rxx=E[X(t)X^H(t)] \qquad (3)$$

where E[·] represents the expected value (ensemble average, i.e., time average).

Next, in step S4, the inverse matrix $Rxx^{-1}$ of the correlation matrix Rxx is calculated.

Next, in step S5, an optimum weighting value or W(OPT) vector is calculated by $$W_{opt} = R_{xx}^{-1} \cdot \bar{s} = \begin{bmatrix} W_{opt1} \\ \vdots \\ W_{optk} \end{bmatrix} = \begin{bmatrix} WR_{opt1} + jWI_{opt1} \\ \vdots \\ WR_{optk} + jWI_{optk} \end{bmatrix} \qquad (4)$$

That is, the optimum weighting vector is determined from the product of the inverse matrix of the correlation matrix, $Rxx^{-1}$, and the steering vector $\bar{s}$.

Subsequently, in step S6, each complex weight W(OPT) is converted into a phase/amplitude weight as follows:

$$\begin{cases} A_{optk} = (|WR_{optk}|^2 + |WI_{optk}|^2)^{\frac{1}{2}} \\ \text{(i) When } WR_{optk} < 0 \text{ and } WI_{optk} > 0 \\ \phi_{optk} = \tan^{-1}\left(\frac{WI_{optk}}{WR_{optk}}\right) + \pi \\ \text{(ii) When } WR_{optk} < 0 \text{ and } WI_{optk} < 0 \\ \phi_{optk} = \tan^{-1}\left(\frac{WI_{optk}}{WR_{optk}}\right) - \pi \\ \text{(iii) In a case other than (i) and (ii)} \\ \phi_{optk} = \tan^{-1}\left(\frac{WI_{optk}}{WR_{optk}}\right) \end{cases} \qquad (5)$$

Finally, in step S7, the phase and amplitude weight values thus obtained are stored in the weight value storage section 49 in the form of a table.

The algorithms for determining optimum weighting values for reception include the method of minimum mean squares of errors (MMSE), the constant envelope signal algorithm (CMA), etc. Information that is to be known in advance varies with the algorithms used.

Figure 7:
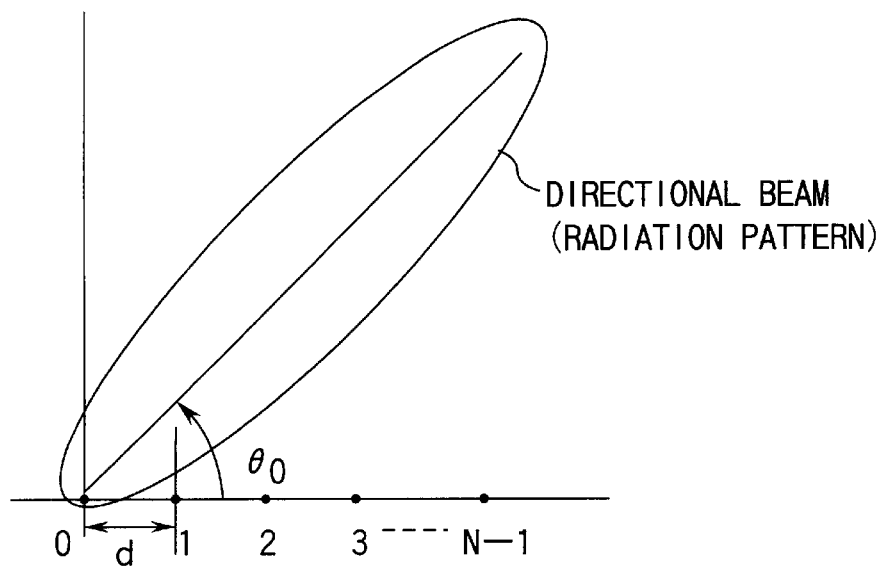
FIG. 7 is a diagram for use in explanation of the way to produce a transmit beam in the direction of angle θ 0 by adjusting weight values in the transmitting section of the base station in the first embodiment.

FIG. 7 shows an example of directivity synthesis by the transmitting section. There are some directivity synthesis theories of array antennas. The basic equation representing the combined directivity of linear array antennas is given by $$E(\theta) = \sum_{n=0}^{N-1} An \exp\{jnkd(\cos\theta - \cos\theta_O)\} \quad (6)$$

$$k=2\pi/\lambda$$

where $\lambda$ represents wave length, $E(\theta)$ represents the amplitude in the direction of $\theta$ and An represents the amplitude weight value for the n-th element.

This equation (6) is an equation used in orienting the radiation pattern in the direction of θ0, i.e., in the desired direction.

FIG. 7 shows an radiation pattern (directivity) of an array antenna in which N antenna elements are arranged at regular intervals of d. The pattern is directed in the direction of θ0. This figure shows the most straightforward example when a transmit beam is radiated in the direction of θ0 by adjusting the weight values in the transmitting section of the base station. In the figure, black dots 0 to N−1 indicate the antenna elements of the array antenna. In order to obtain the radiation pattern in the desired direction of θ0, the excitation phase of the n-th element is simply set to n·k·d·cos θ0. As a result, in-phase electromagnetic radiation are radiated pointing in the desired direction of θ0 from the antenna elements 21. The values for An can be determined using a mathematical method. Antennas in which side lobes are reduced using this method include the Dolph-Chebyshev array antenna, the Talor distribution array antenna, etc.

Thus, in the transmitting section as well, desired directivity of the array antenna can be obtained by adjusting the phase and amplitude weight values. There are some methods of transmission directivity synthesis besides the above-described one.

In the above-described method, the optimum directional beam is determined in advance for each terminal station and then used repeatedly. This method is therefore effective where the communications environment or the location of each terminal station is little subject to variation. However, in practice, since people may increase or decrease in number or instruments may be shifted, the communications environment will be subject to variation. It is therefore required to acquire knowledge about desired and undesired radiation over again.

Figure 8:
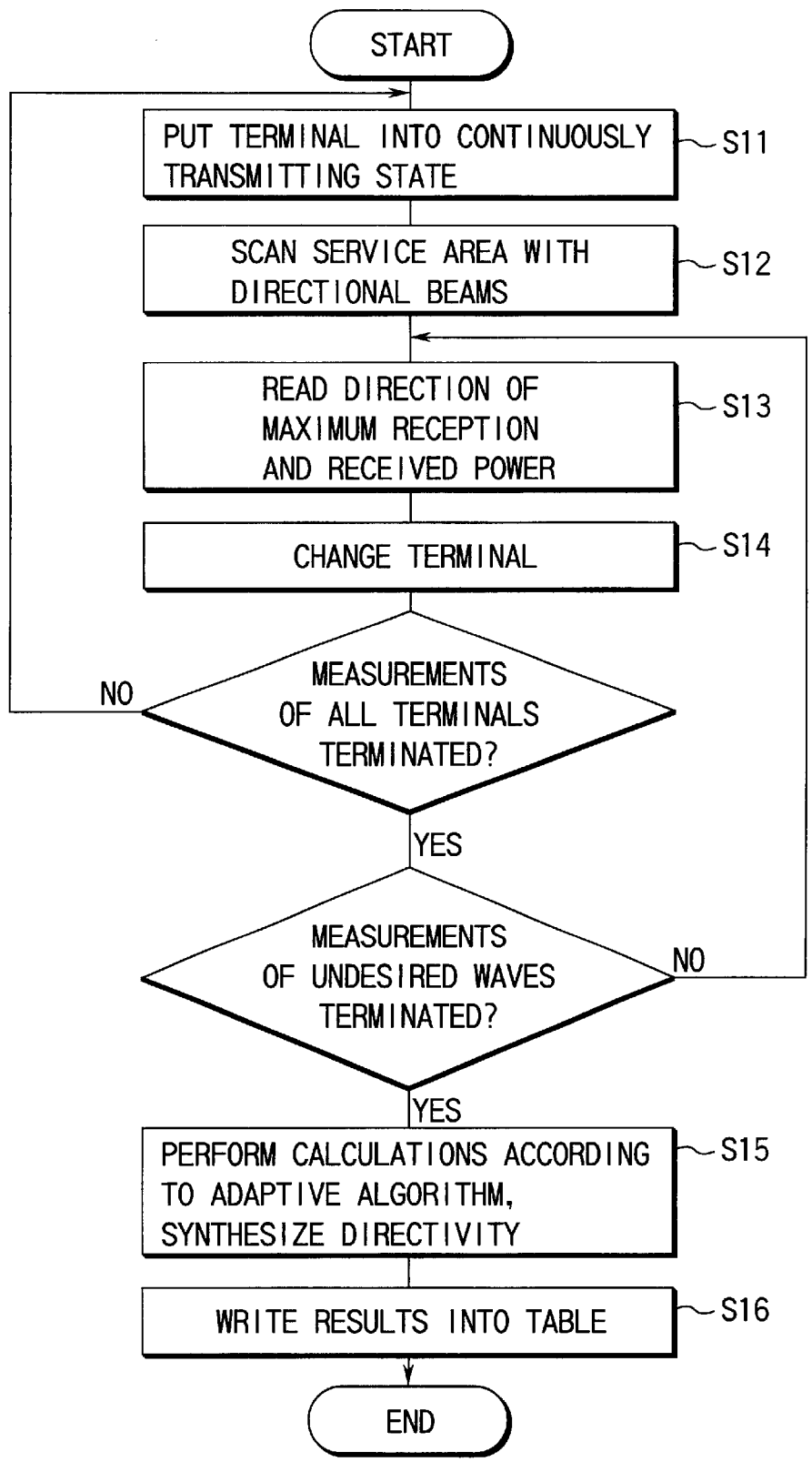
FIG. 8 is a flowchart for learning processing by which the base station measures the direction and received power of desired and undesired radiation and then adjusts the weight values in advance in the first embodiment.

FIG. 8 is a flowchart for learning processing by which the base station measures the directions at which desired and undesired waves arrive and received levels of the waves and then calculates the weight values in advance. The learning processing is controlled by the transmission/reception controller 48 and performed, for example, when a base station and its associated terminal stations are installed.

First, in step S11, a terminal station is placed in the continuously transmitting state for the purpose of determining the direction of propagation of radiation therefrom. In step S12, by changing the phase and amplitude weight values for the antenna elements of the array antenna in sequence, the base station searches for the radiation from that terminal station. In step S13, the direction of reception of maximum radiation and the received level of the radiation from that terminal station are measured and the measurements are then stored in the desired/undesired information input section 61. At the termination of the measurement, switching is made from that terminal station to another in step S14 and the procedure is then repeated beginning with step S11.

After the termination of measurements for all the terminal stations, undesired radiation is measured. In this measurement process, all the terminal stations are stopped from perform transmissions and the direction and received power of arriving undesired radiation are measured. The measurements are then stored in the desired/undesired radiation information input section 61. After the termination of the undesired radiation measurement, weight values are determined in accordance with the adaptive algorithm and the directivity of the antenna is combined in step S15. In step S16, the results obtained are written into the table in the weight value storage section 49.

In communicating with terminal stations, no terminal station with which connection is to be set up is specified at first. The base station thus scans its associated service area with directional beams and waits to receive a communication request signal from a terminal station. Upon receipt of a communication request signal from a certain terminal station, the base station reads the weight values for that terminal station from the weight value storage section 49 and sets them in the weight value setting section 37 to thereby weight the attenuators and the phase shifters in the transmitting and receiving sections. Thus, the optimum radiation pattern for that terminal station is formed and data transmissions are then performed between the base station and the terminal station.

At the termination of the data transmissions, the base station scans its associated service area again with directional beams in accordance with the switching sequence by the sequence controller 60 and waits to receive a communication request signal from a terminal station.

In an application of the invention to a wireless POS system, a POS terminal that makes a request for communication is given a sufficient time for communication and no time is spent on POS terminals that make no communication request, thus improving the system efficiency.

Moreover, the arrangement is very simple because the weight values used in producing the directivity in transmission and reception have been prestored in the weight value storage section 49 and, at the time of communication with a terminal station, the amplitude and phase weight values for that terminal station are read from the storage section to control the attenuators and phase shifters.

Figure 9:
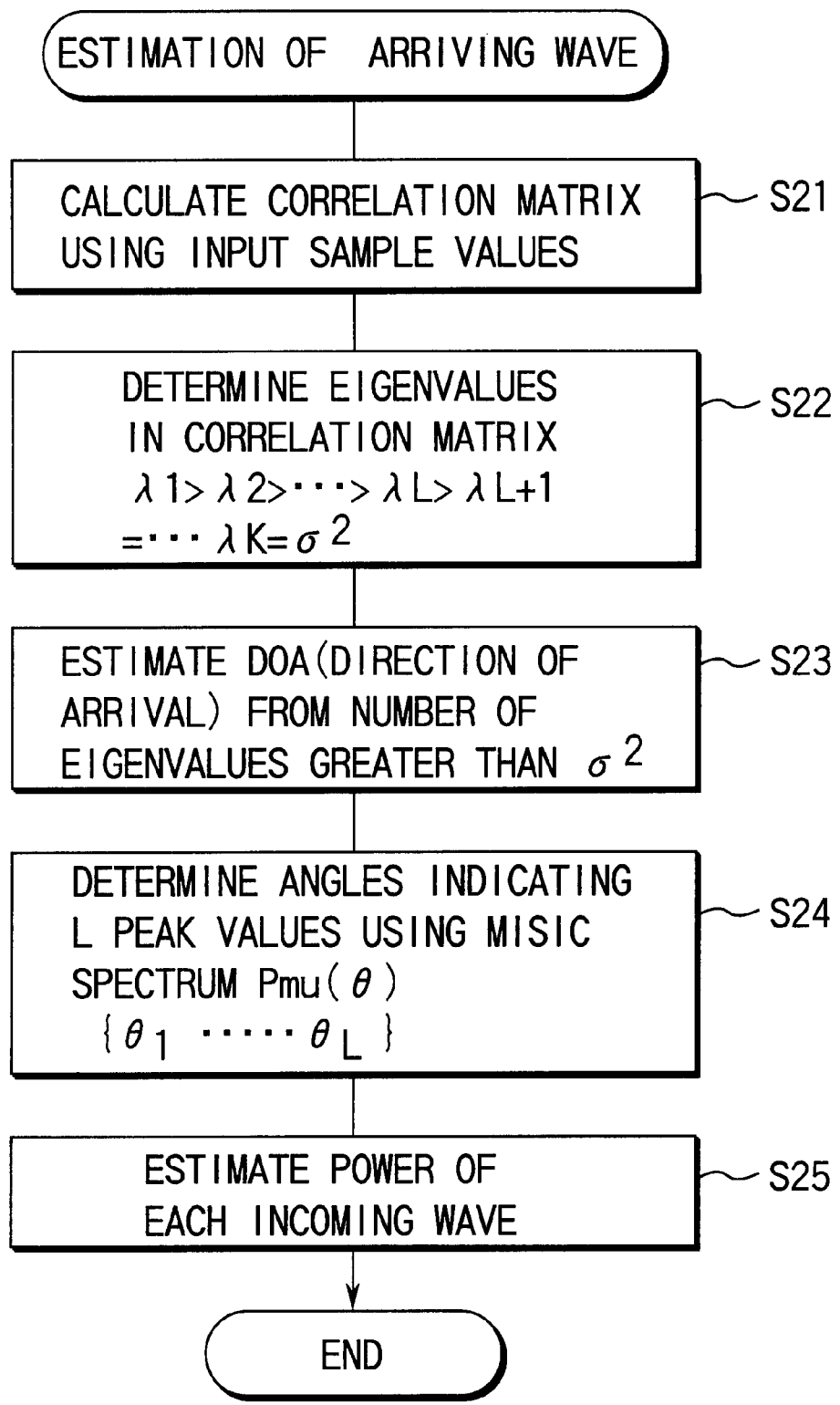
FIG. 9 is a flowchart for estimation processing by which the base station estimates the directions of arriving waves.

As the process of calculating the weight values in advance, the present embodiment has been described in terms of an example of actually measuring the directions and received power of desired and undesired waves using directional beams. However, this is merely exemplary and other preprocessing is also possible. For example, as in arriving radiation estimation processing shown in FIG. 9, the direction of arriving radiation and the received power thereof can be estimated to adjust weight values in advance. This estimation processing is referred to as the MUSIC algorithm.

First, in step S21, using input sample values from the antenna elements, correlation matrix Rxx is calculated by $$Rxx=E[X(t)X^H(t)] \quad (7)$$

Next, in step S22, eigenvalues $\lambda 1, \lambda 2, \ldots$ of the correlation matrix are determined in accordance with the equations $$Rxxe=\lambda e \quad (8)$$

$$\sigma^2=E[N^H(t)N(t)]/k \quad (9)$$

$$\lambda 1 > \lambda 2 > \ldots \lambda L > \lambda L+1^- \ldots \lambda k = \sigma^2$$

where $\sigma^2$ denotes internal noise power.

Next, in step S23, the direction of arriving radiation is estimated from the number of eigenvalues greater than $\sigma^2$.

Next, in step S24, directions $\{\theta 1 \ldots \theta L\}$ for L number of peak values are determined using MUSIC spectrum $Pmu(\theta)$ given by $$Pmu(\theta) = \frac{a^H(\theta) a(\theta)}{\sum_{i=L+1}^{k} |e_i^H a(\theta)|^2} \quad (10)$$

wherein, $a(\theta_i) = [\exp\{j\phi_1(\theta_1)\}, \ldots, \exp\{j\phi_k(\theta_i)\}]^T$ $\phi k(\theta i)$: reception phase of k th element Finally, in step S25, the power S of each input radiation is estimated by $$S = (A^H A)^{-1} A^H (Rxx - \sigma^2 U) A (A^H A)^{-1} \quad (11)$$

Thus, the i-th diagonal component in the power S corresponds to the received power of the i-th arriving radiation.

Such estimation processing can also provide information concerning desired radiation and undesired radiation. However, note that that the array antenna requires not less than (L+1) elements. Other arriving radiation estimation methods can also be used.

Second Embodiment

Figure 10:
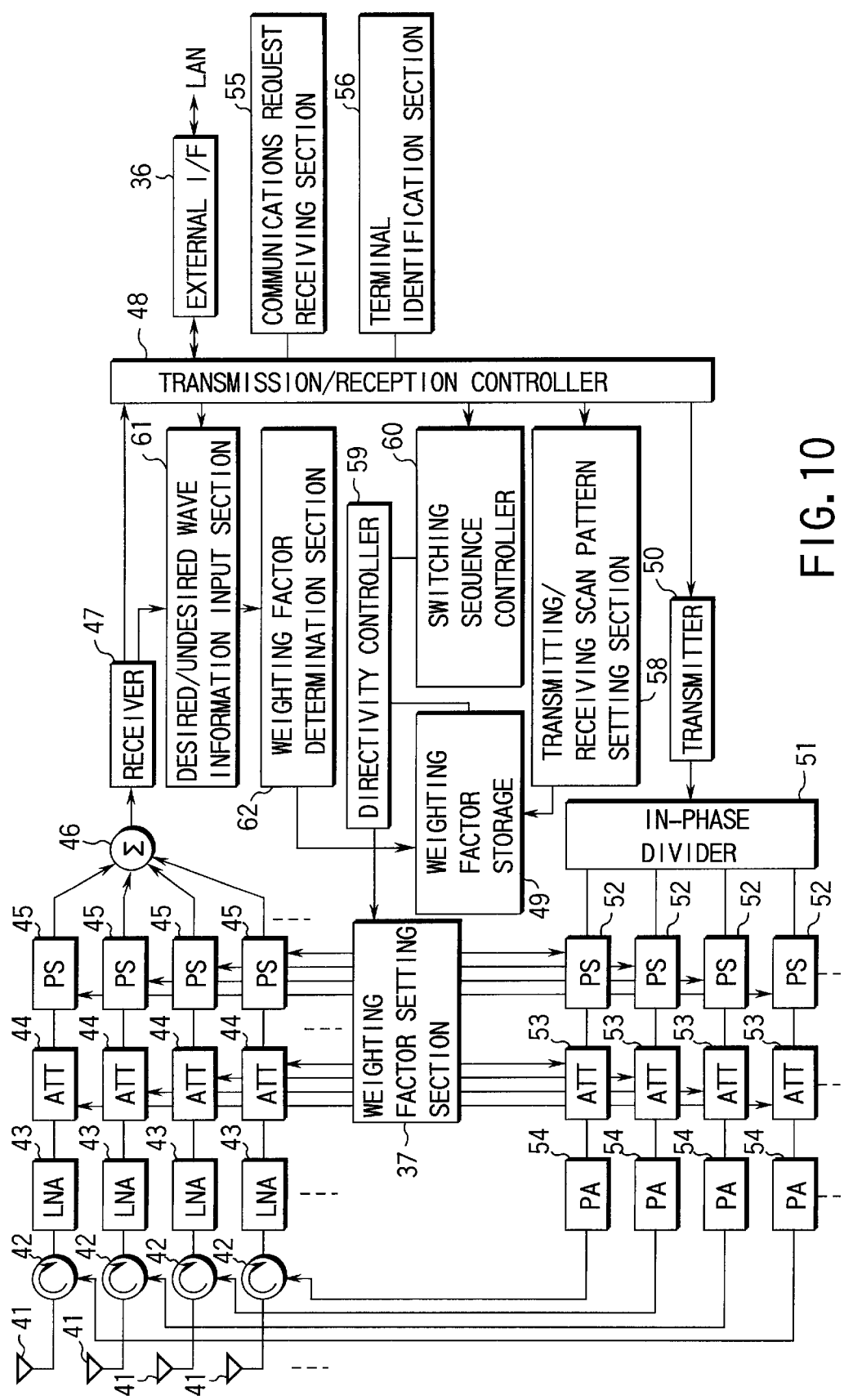
FIG. 10 is a block diagram of a base station according to a second embodiment of the present invention.

FIG. 10 is a block diagram of the base station according to a second embodiment of the present invention. In this figure, like reference numerals are used to denote corresponding components to those in the first embodiment and descriptions thereof are omitted.

Figure 11A:
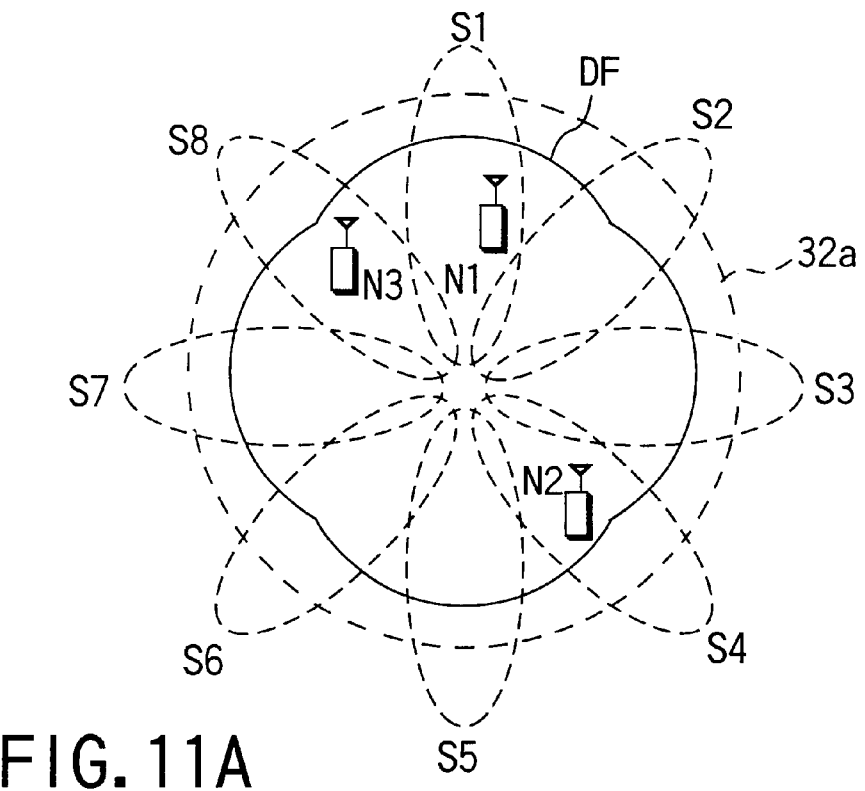
FIG. 11A shows directional patterns of the base station when no terminal station is specified in the second embodiment.

In the base station of this embodiment, the base station identification signal transmitting section 57 is removed. When no terminal station with which connection is to be set up is specified, the directivity controller 59 sets the directional pattern of the receiving section to each of S1 to S8 in sequence or to omnidirectional directional pattern DF as shown in FIG. 11A. Here, the second embodiment will be described by way of the example of setting the receiving directivity to the omnidirectional pattern DF.

Figure 11B:
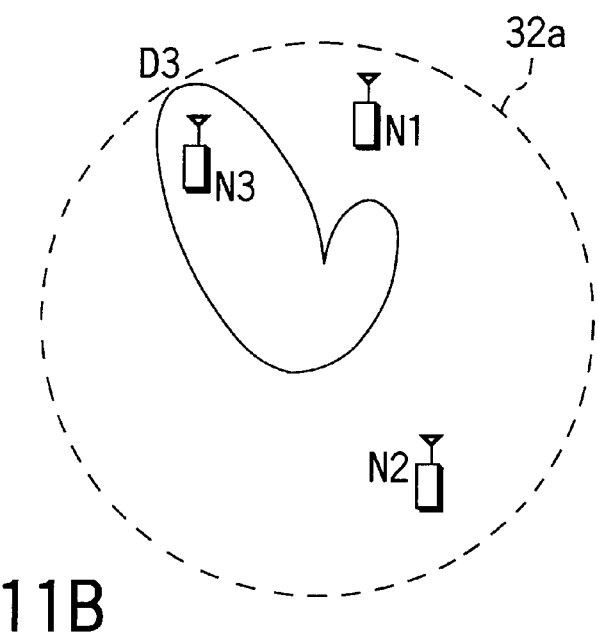
FIG. 11B shows a directional pattern of the base station when a terminal station has been specified in the second embodiment.

When a communication request occurs in the terminal station N3 by way of example, the terminal station N3 sends a terminal identification signal and a communication request signal to the base station 32. Upon receiving these signals, the base station starts communication with the terminal station N3. At this point, the base station resets its transmitting/receiving directional pattern to the optimum directional pattern which, as indicated as directional pattern D3 in FIG. 11B, is the most suitable for the direction of the terminal station N3 and causes the base station to make a null response in the direction of arriving undesired radiation.

Figure 12:
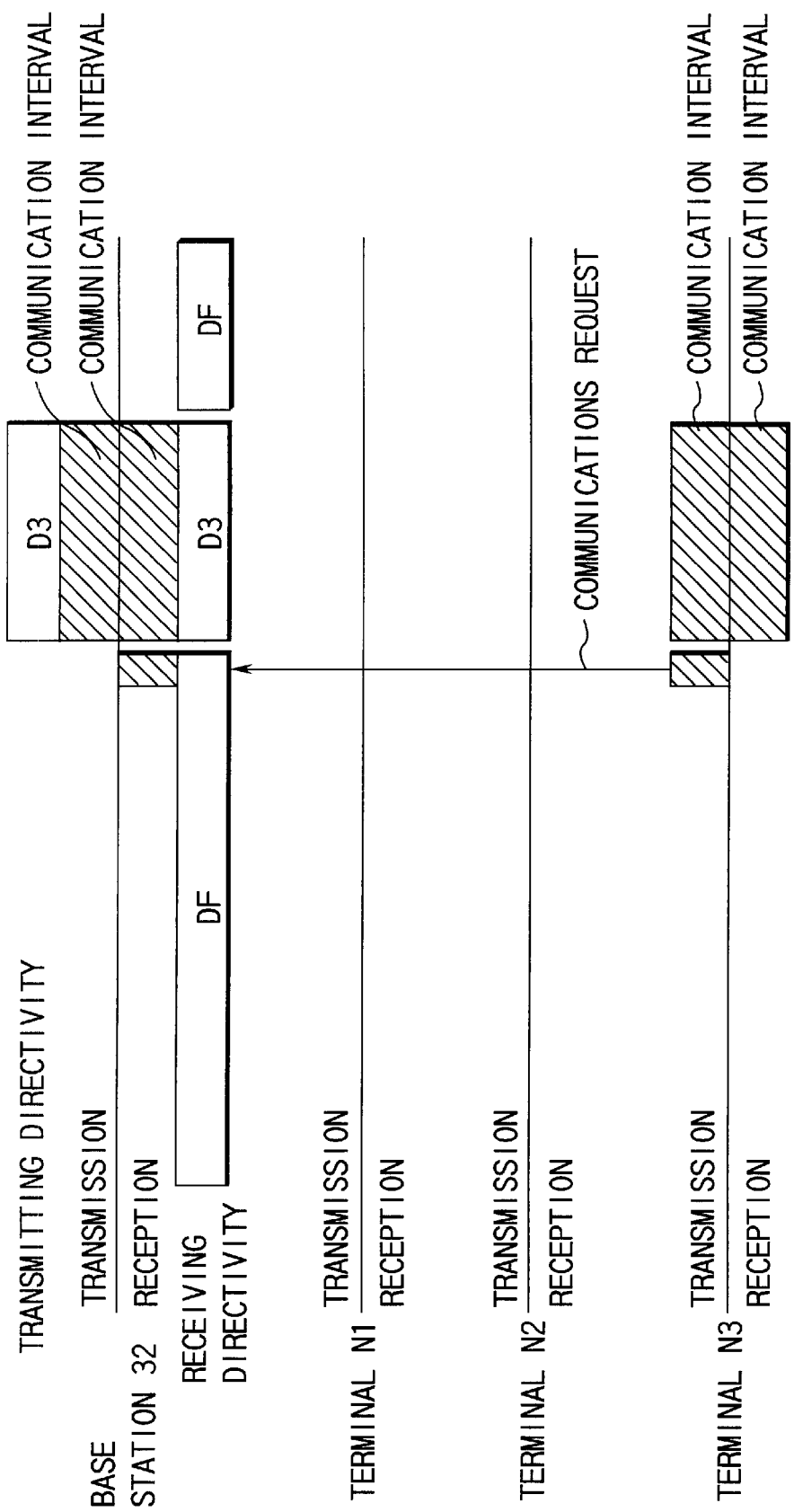
FIG. 12 is a timing diagram illustrating the operation of communications between the base station and a terminal station in the second embodiment.

FIG. 12 is a timing diagram illustrating the operation of communications between the base station and a specific terminal station in this embodiment. When no terminal station is specified, the base station 32 sets its receiving directional pattern to the omnidirectional pattern DF for the service area 32a and waits for a communication request from a terminal station. When, in this state, a communication request occurs in the terminal station N3, it sends a terminal identification signal and a communication request signal to the base station after making sure that another terminal station is not in communication with the base station. This is because the base station is not capable of communicating with two or more terminal stations at the same time. The terminal station can make a decision of whether or not another terminal station is in communication with the base station by means of carrier sensing.

Upon receiving the terminal identification signal and the communication request signal from the terminal station N3, the base station 32 confirms, via the communication request receiving section 55, that a communication request has been made by a terminal station, so that the terminal identification section 56 identifies the terminal station N3 as a terminal with which communications are to be performed.

The directivity controller 59 then reads the weight values associated with the terminal station N3 from the weight value storage section 49 into the weight value setting section 37, which in turn feeds the amplitude weight values into the receiving attenuators 44 and the transmitting attenuators 53 and the phase weight values into the receiving phase shifters 45 and the transmitting phase shifters 52.

Thereby, the base station 32 sets the transmitting/receiving directivity of the array antenna to the directional pattern D3 shown in FIG. 11B and commences performing communications with the terminal station N3. That is, data transmissions are performed between the base station 32 and the terminal station N3. At the termination of the communications, the sequence controller 60 provides a switching signal to the directivity controller 59, which in turn reads weight values used when no terminal station is specified from the weight value storage section 49 and feeds them into the weight value setting section 37. As a result, the amplitude control amounts are set in the attenuators 44 and 53 and the phase control amounts are set in the phase shifters 45 and 52.

In this manner, the base station 32 resets the receiving directivity to the omnidirectional pattern DF as shown in FIG. 11A and enters the wait state for a communication request from either of the terminal stations N1, N2 and N3 in the service area 32a.

Although the embodiment has been described in terms of the example where the receiving directivity of the base station 32 is set to the omnidirectional pattern DF when no terminal station is specified, this is not restrictive. In the second embodiment, as in the first embodiment, the service area 32a may be scanned with directional beams S1 to S8. This also allows the base station to receive a terminal identification signal and a communication request signal from a terminal station that makes a request for communications.

Thus, in the second embodiment as well, any terminal station that is making a request for communications can be identified exactly without allocating time slots for each terminal station and the directivity for that terminal station can be set based on preset weight values for subsequent communications. Therefore, efficient communications can be performed with a requesting terminal station. In addition, no time is spent on terminal stations that perform no communication request. Moreover, the second embodiment is very simple in construction and provides the same advantages as the first embodiment.

Third Embodiment

Figure 13:
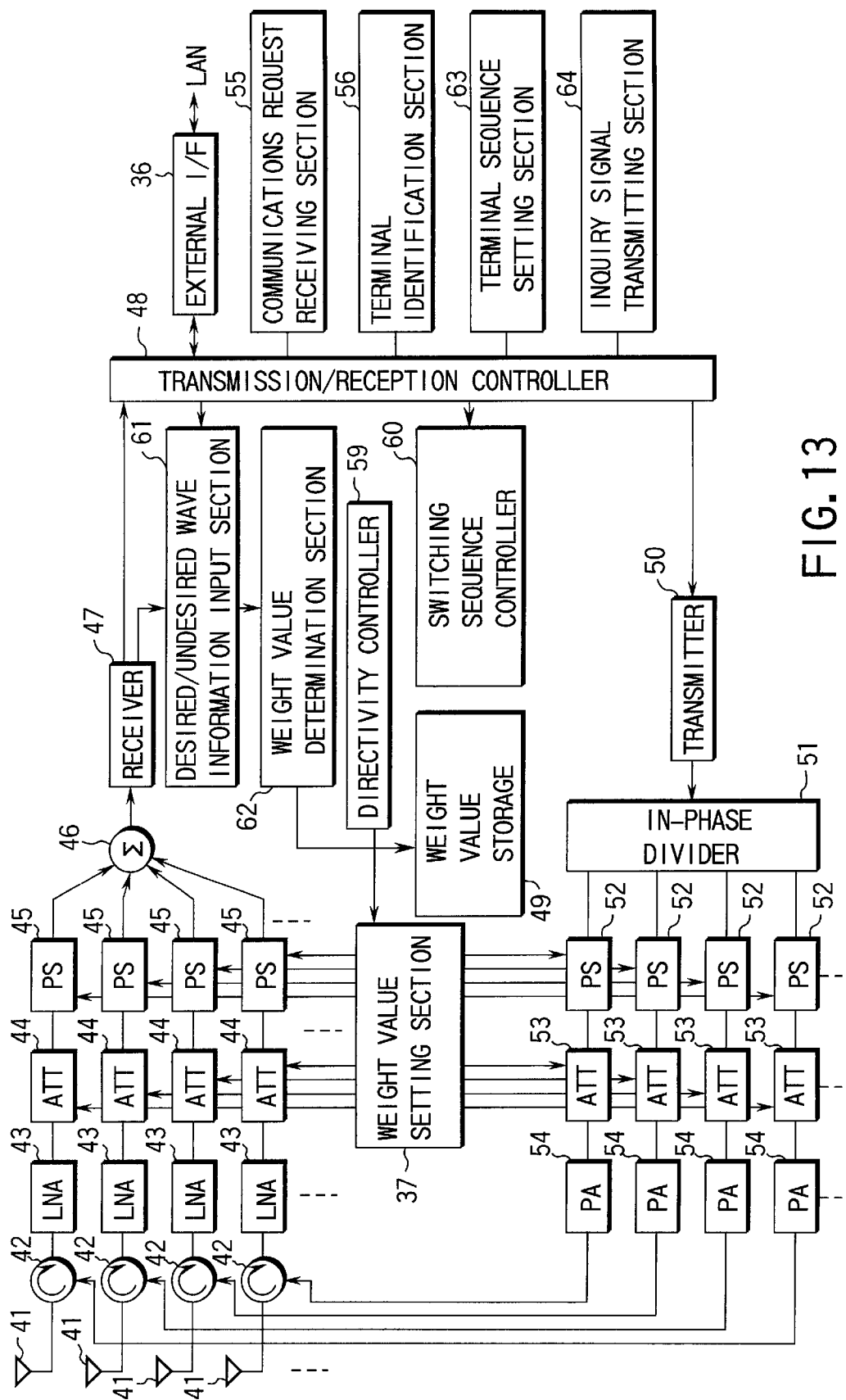
FIG. 13 is a block diagram of a base station according to a third embodiment of the present invention.

FIG. 13 is a block diagram of the base station according to a third embodiment of the present invention. In this figure, like reference numerals are used to denote corresponding components to those in the first embodiment and descriptions thereof are omitted.

In this embodiment as well, the base station identification signal transmitting section 57 is omitted in the base stations 32 and 33. In place of the base station identification signal transmitting section 57, there are provided a terminal sequence setting section 63 that sets a polling sequence for terminal stations and an inquiry signal transmitting section 64 that causes the transmitting section to poll the terminal stations. The terminal sequence setting section 63 and the inquiry signal transmitting section 64 are implemented by a microcomputer.

In this embodiment, the base station 32 repeatedly polls the terminal stations N1, N2 and N3. This polling is performed in accordance with the sequence set by the terminal sequence setting section 63. The base station 32 reads transmitting and receiving weight values preset for each terminal station from the weight value storage section 49 in accordance with the polling sequence to set the transmitting/receiving directivity.

Figure 14:
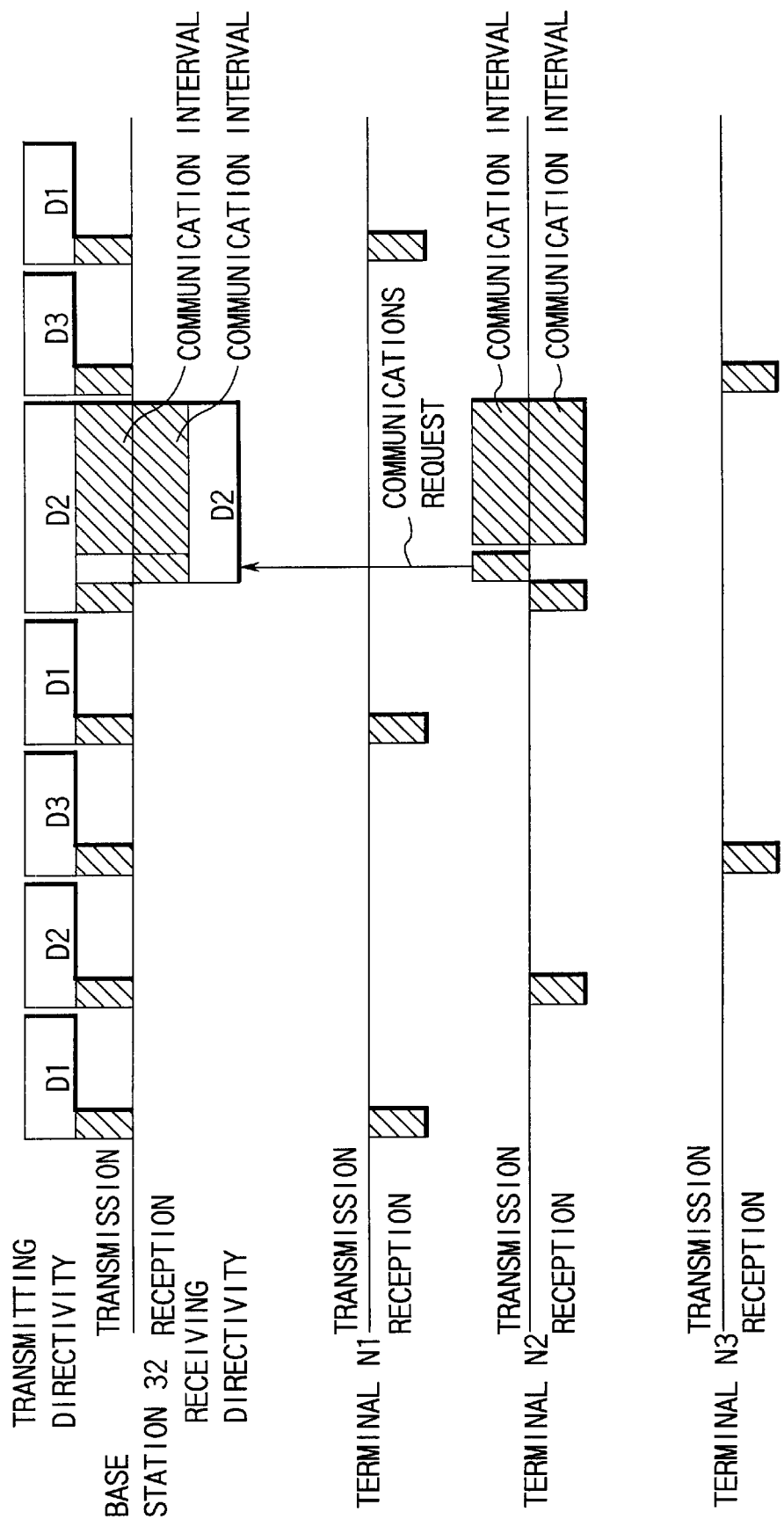
FIG. 14 is a timing diagram illustrating the operation of communications between the base station and a terminal station in the third embodiment.
Figure 15:
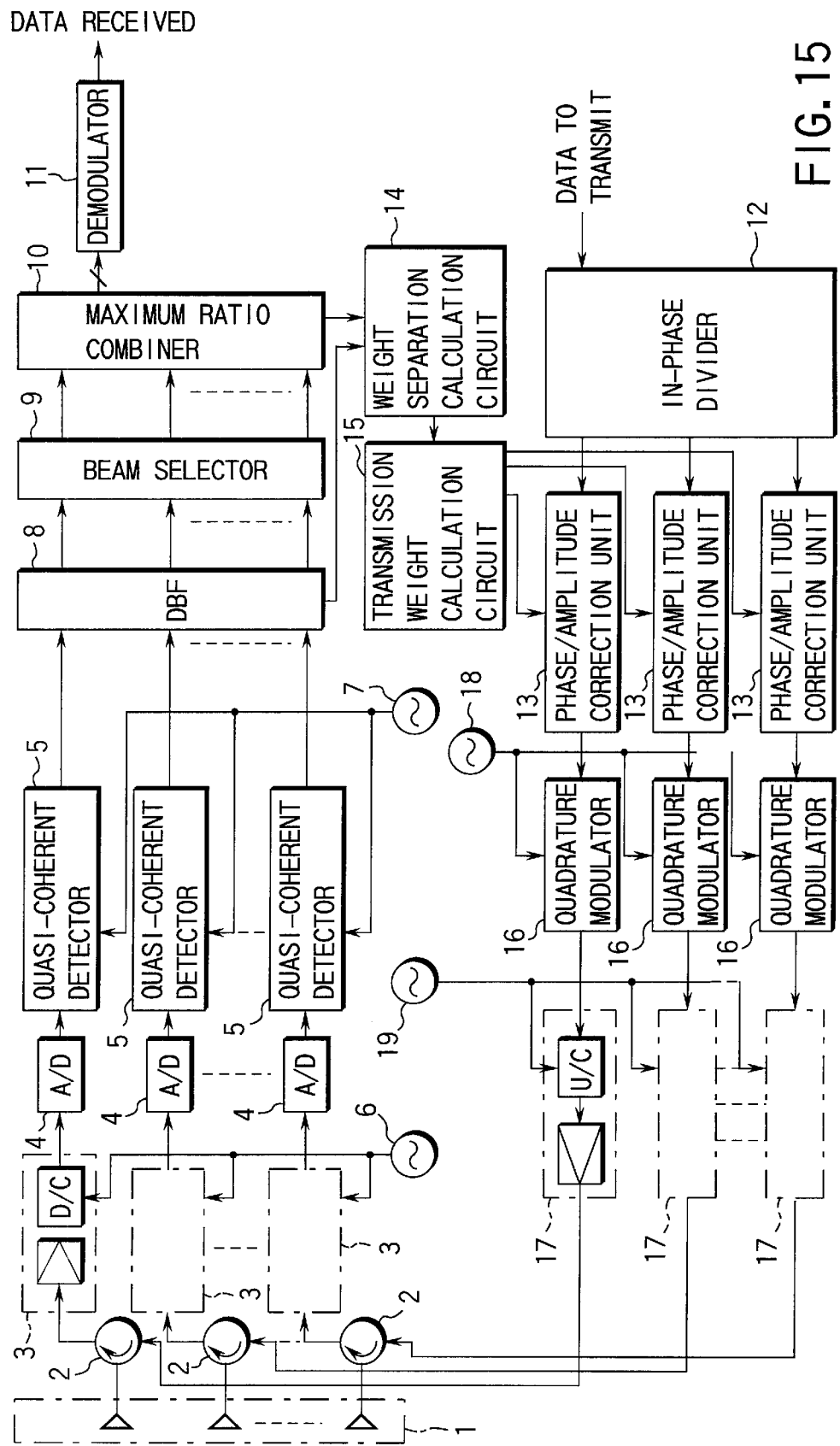
FIG. 15 is a block diagram of a conventional radio station having directivity controlled antenna.
Figure 16:
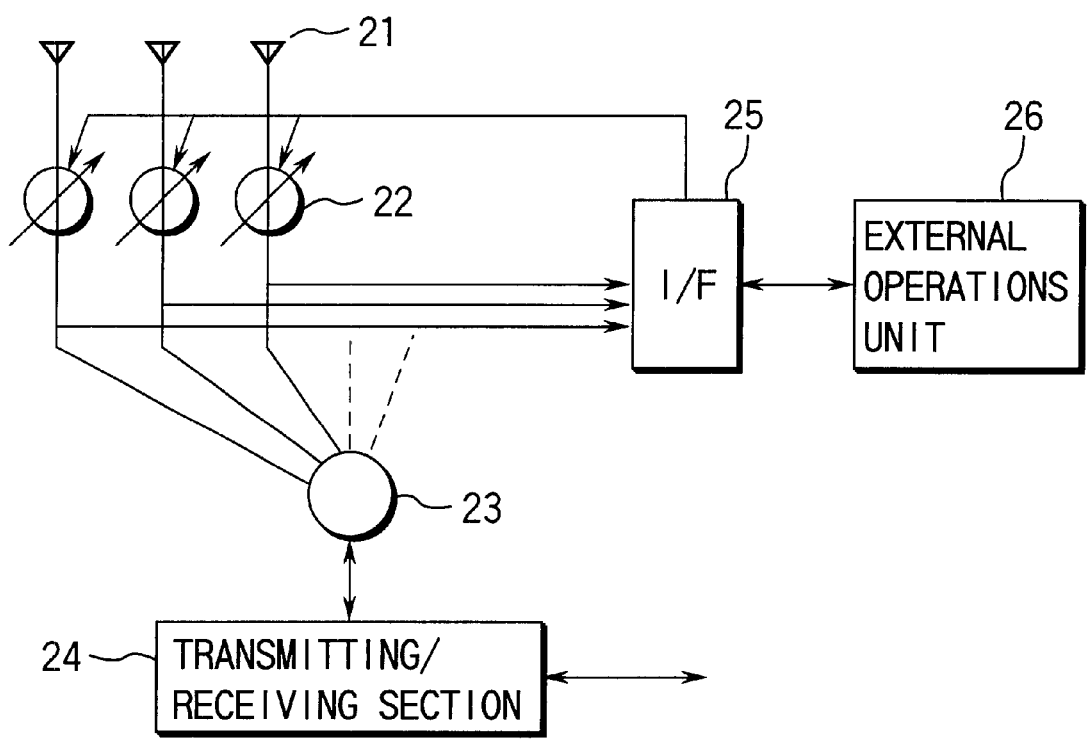
FIG. 16 shows another prior art.

FIG. 14 is a timing diagram illustrating the operation of communications between the base station and a requesting terminal station. The base station 32 polls each of the terminal stations N1, N2 and N3 using a respective one of optimum directional patterns D1, D2 and D3. That is, the base station checks each of the terminal stations N1, N2 and N3 in turn to see if it is making a request for communications. For example, when a communication request occurs in the terminal station N2, it, when polled, sends a terminal identification signal and a communication request signal to the base station 32.

When the base station 32 receives the communication request signal from the terminal station N2, the communication request receiving section 55 confirms it and the terminal identification section 56 identifies the terminal station N2. Communications are then performed between the base station 32 and the terminal station N2. The sequence in which the terminal stations are polled has been specified; thus, if a communication request signal is confirmed at the time of polling the terminal station N2, then the base station can also transmit to and receive from the terminal station N2 immediately.

At the termination of communications with the terminal station N2, the sequence controller 60 supplies a switching signal to the directivity controller 59, which in turn sets the transmitting/receiving directivity on the basis of weight values for the terminal station N3 so that it will be polled next.

Thus, if, when each of the terminal stations is polled in sequence, a communication request is received from a terminal station, data communications are performed with that terminal station under the directivity already set. In this embodiment as well, therefore, any terminal station that is making a request for communications can be identified exactly without allocating time slots for each terminal station and the directivity for that terminal station can be set based on preset weight values for subsequent communications. Therefore, efficient communications can be performed with a requesting terminal station. In addition, no time is spent on terminal stations that make no communication request. Moreover, the third embodiment is very simple in construction and provides the same advantages as the first embodiment.

Although the embodiments of the present invention have been described in terms of an indoor radio communication system such as a wireless POS system, the principles of the present invention are also applicable to other radio communication systems.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. In a radio communication system comprising a base station having a radio communications device that includes a receiving section which weights the amplitude and phase of each of received signals from a plurality of antenna elements, then combines the weighted signals into a composite signal and demodulates the resultant composite signal and a transmitting section which divides a modulated signal into a plurality of transmit signals, then weights the amplitude and phase of each of the transmit signals and radiates each of the weighted transmit signals from a corresponding respective one of the antenna elements, and a plurality of terminal stations each of which performs communications with the base station by radio, each of the terminal stations including transmitting means for, when a communication request occurs in it, transmitting a communication request signal in response to reception of a base station identification signal from the base station; and the base station further comprising:
weight value storage means for storing a set of amplitude and phase weight values for each of the terminal stations, each set of amplitude and phase weight values being used when a corresponding one of the terminal stations communicates with the base station and the amplitude and phase weight values in each set being determined for each of the antenna elements, and storing scanning amplitude and phase weight values used when the base station scans its associated service area with directional beams to search for a terminal station that makes a request for communications;

base station identification signal transmitting means for transmitting a base station identification signal via the transmitting section;

communication request receiving means for receiving the communication request signal transmitted from a terminal station in response to the base station identification signal;

terminal station identifying means for identifying the requesting terminal station that has transmitted the communication request signal received by the communication request receiving means;

directivity control means for, when no terminal station to communicate with the base station is specified, controlling the directivity of the transmitting and receiving sections on the basis of the scanning amplitude and phase weight values to cause the base station to scan its associated service area with directional beams and, when a terminal station is specified, fixing the directivity of the transmitting and receiving sections on the basis of the weight values corresponding to that terminal station specified; and means for radio communicating with the terminal station specified with the directivity of the transmitting and receiving sections controlled by the directivity control means.

2. The system according to claim 1, wherein the base station further comprises sequence control means for controlling the directivity control means at each termination of communications with a specific terminal station so that the base station scans its associated service area with directional beams.

3. The system according to claim 1, wherein the weight values stored in the weight value storage means are values calculated from the direction and power of arriving radiation from each of the terminal stations, the direction and power of undesired radiation, and thermal noise power of the receiving section.

4. The system according to claim 1, wherein each terminal station is used connected with a respective one of POS terminals in a wireless POS system in which data transmissions are performed by radio between host equipment that manages overall sales of a store and a number of POS terminals that register data on sales of goods at individual counters.

5. The system according to claim 1, wherein the each of the terminal stations includes means for transmitting a communication request signal when a communication request occurs in it, and wherein the weight value storage means in the base station includes means for storing weight values adapted to obtain omnidirectional receiving directivity when no terminal station is specified and the directivity control means in the base station includes means for setting the directivity of the receiving section to the omnidirectional directivity on the basis of those weight values when no terminal station is specified.

6. The system according to claim 5, in which the base station further comprises sequence control means for controlling the directivity control means at each termination of communications with a specific terminal station so that the directivity of the receiving section is set to the omnidirectional directivity.

7. In a radio communication system comprising a base station having a radio communications device that includes a receiving section which weights the amplitude and phase of each of received signals from a plurality of antenna elements by amplitude and phase weight values, then combines the weighted signals into a composite signal and demodulates the resultant composite signal and a transmitting section which divides a modulated signal into a plurality of transmit signals, then weights the amplitude and phase of each of the transmit signals by amplitude and phase weight values and radiates each of the weighted transmit signals from a corresponding respective one of the antenna elements, and a plurality of terminal stations each of which is adapted to perform communications with the base station by radio, each of the terminal stations including transmitting means for, when a communication request occurs in it, transmitting a communication request signal in response to polling by the base station; and the base station further comprising:

terminal sequence setting means for setting a polling sequence defining the order in which the terminal stations are polled;

weight value storage means for storing a set of weight values for each of the terminal stations, each set of weight values being used when a corresponding one of the terminal stations communicates with the base station and each of weight values being determined for each of the antenna elements;

polling means for causing the transmitting section to poll each of the terminal stations in accordance with the polling sequence set by the terminal sequence setting means;

communication request receiving means for receiving the communication request signal transmitted from a terminal station in response to polling;

directivity control means for controlling the directivity of the transmitting and receiving sections by reading weight values for each of the terminal stations from the weight value storage means in accordance with the polling sequence; and means for radio communicating with a terminal station for which a communication request signal has been confirmed by the communication request receiving means with the directivity of the transmitting and receiving sections controlled by the directivity control means.

8. The system according to claim 7, wherein each terminal station is used connected with a respective one of POS terminals in a wireless POS system in which data transmissions are performed by radio between host equipment that manages overall sales of a store and a number of POS terminals that register data on sales of goods at individual counters.

9. A radio communications device used in a base station having a receiving section which weights the amplitude and phase of each of received signals from a plurality of antenna elements by weight values, then combines the weighted signals into a composite signal and demodulates the resultant composite signal and a transmitting section which divides a modulated signal into a plurality of transmit signals, then weights the amplitude and phase of each of the transmit signals and radiates each of the weighted transmit signals from a corresponding respective one of the antenna elements and communicating with a plurality of terminal stations by radio, comprising:

weight value storage means for storing a set of amplitude and phase weight values for each of the terminal stations, each set of amplitude and phase weight values being used when a corresponding one of the terminal stations communicates with the base station and the amplitude and phase weight values in each set being determined for each of the antenna elements, and storing scanning amplitude and phase weight values used when the base station scans its associated service area with directional beams to search for a terminal station that makes a request for communications;

base station identification signal transmitting means for transmitting a base station identification signal via the transmitting section;

communication request receiving means for receiving the communication request signal transmitted from a terminal station in response to the base station identification signal;

terminal station identifying means for identifying the requesting terminal station that has transmitted the communication request signal received by the communication request receiving means;

directivity control means for, when no terminal station to communicate with the base station is specified, controlling the directivity of the transmitting and receiving sections on the basis of the scanning amplitude and phase weight values to cause the base station to scan its associated service area with directional beams and, when a terminal station is specified, fixing the directivity of the transmitting and receiving sections on the basis of the weight values corresponding to that terminal station specified; and means for radio communicating with the terminal station specified with the directivity of the transmitting and receiving sections controlled by the directivity control means.

10. The radio communications device according to claim 9, further comprising sequence control means for controlling the directivity control means at each termination of communications with a specific terminal station so that the base station scans its associated service area with directional beams.

11. The radio communications device according to claim 9, wherein the weight values stored in the weight value storage means are values calculated from the direction and power of arriving radiation from each of the terminal stations, the direction and power of undesired radiation, and thermal noise power of the receiving section.

12. The radio communications device according to claim 9, wherein the device is used as a base station in a wireless POS system in which data transmissions are performed by radio between host equipment that manages overall sales of a store and a number of POS terminals that register data on sales of goods at individual counters.

* * * * *